Oct. 21, 1952          C. C. SACHS          2,614,949
STRUCTURAL PANEL FORMING MACHINE
Filed Sept. 13, 1949          6 Sheets-Sheet 1
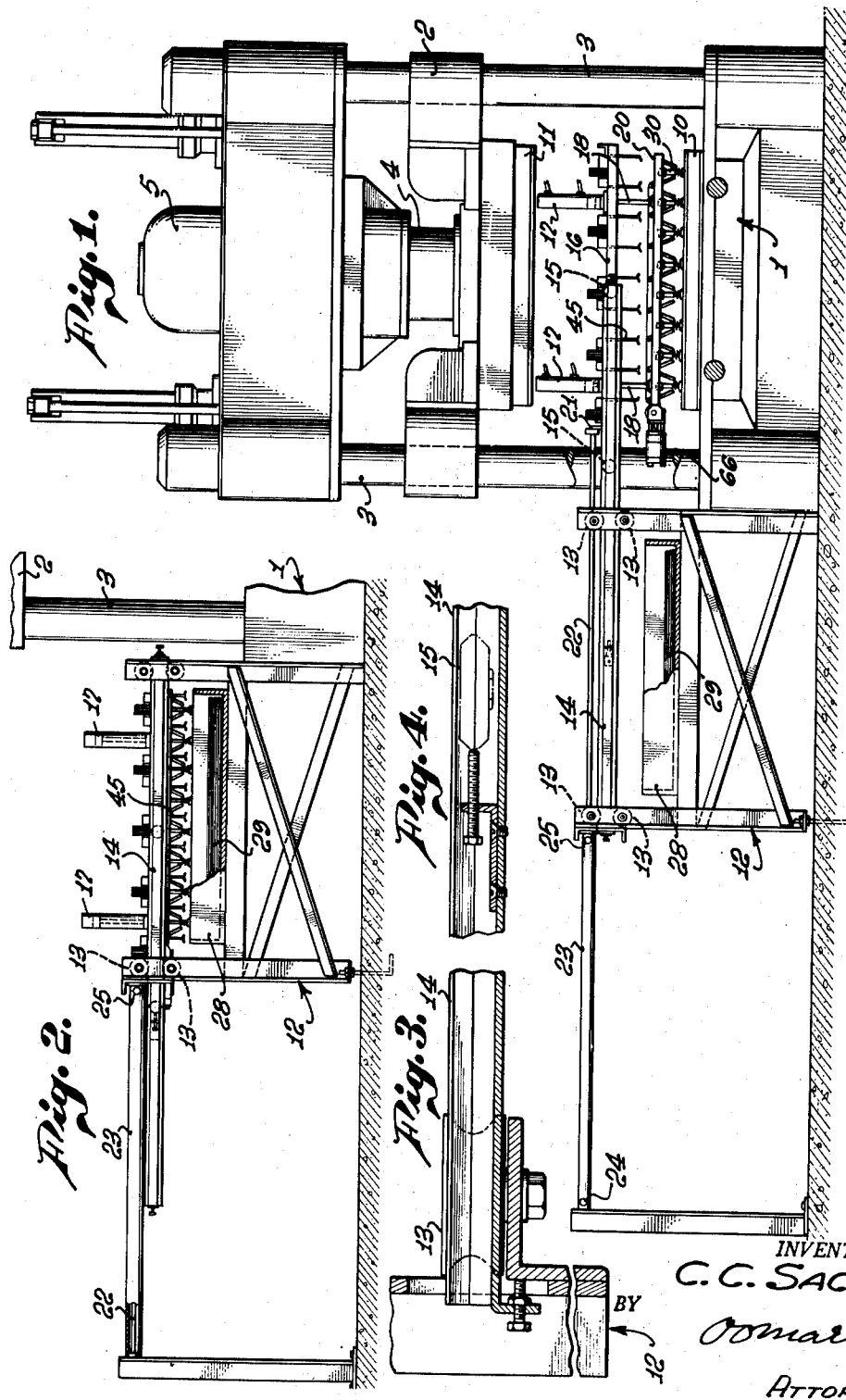
INVENTOR:
C. C. SACHS,
BY O. Martin,
ATTORNEY.

Oct. 21, 1952  C. C. SACHS  2,614,949
STRUCTURAL PANEL FORMING MACHINE
Filed Sept. 13, 1949  6 Sheets-Sheet 2
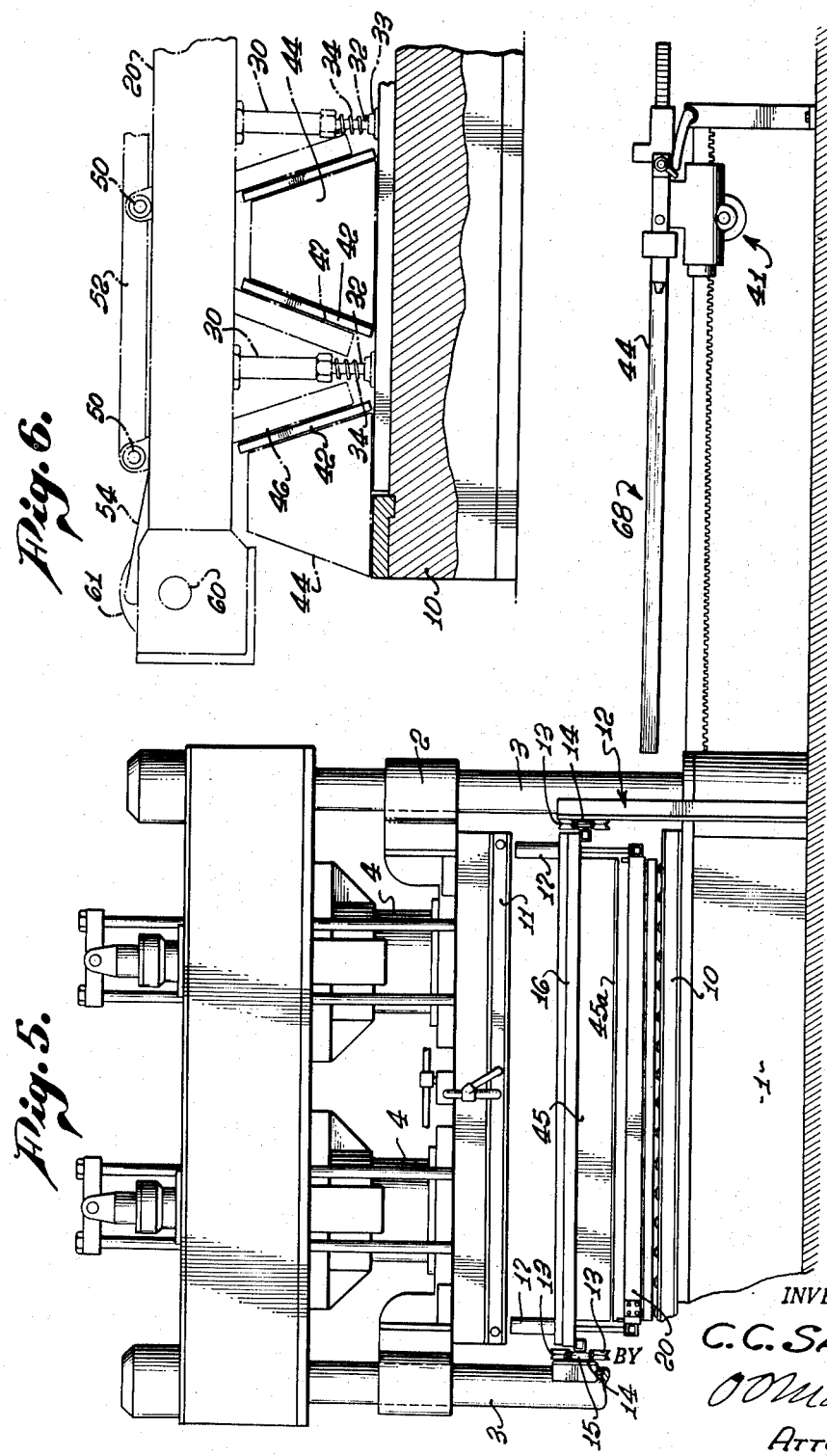
INVENTOR:
C. C. SACHS,
O O Martin,
ATTORNEY.

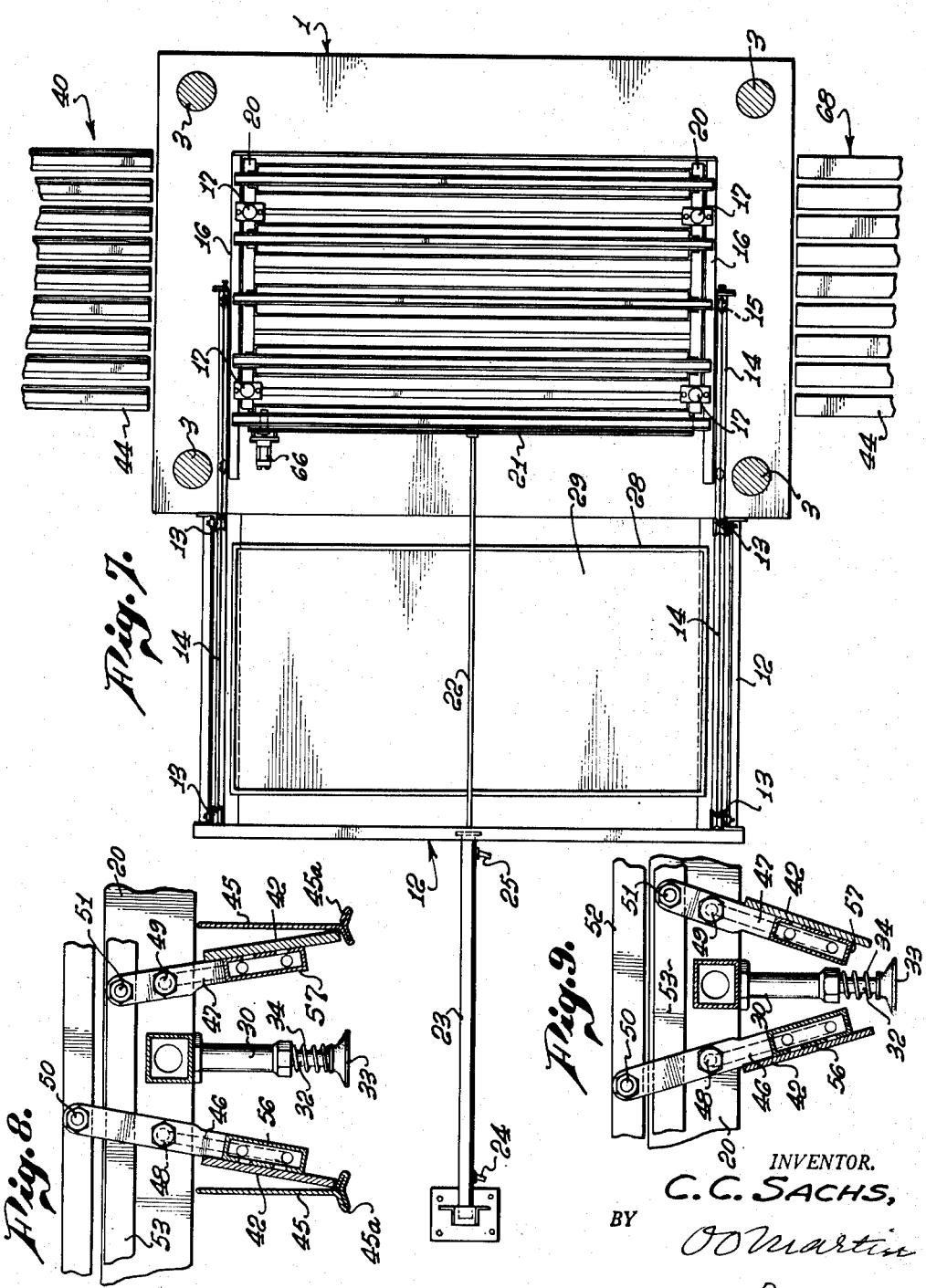

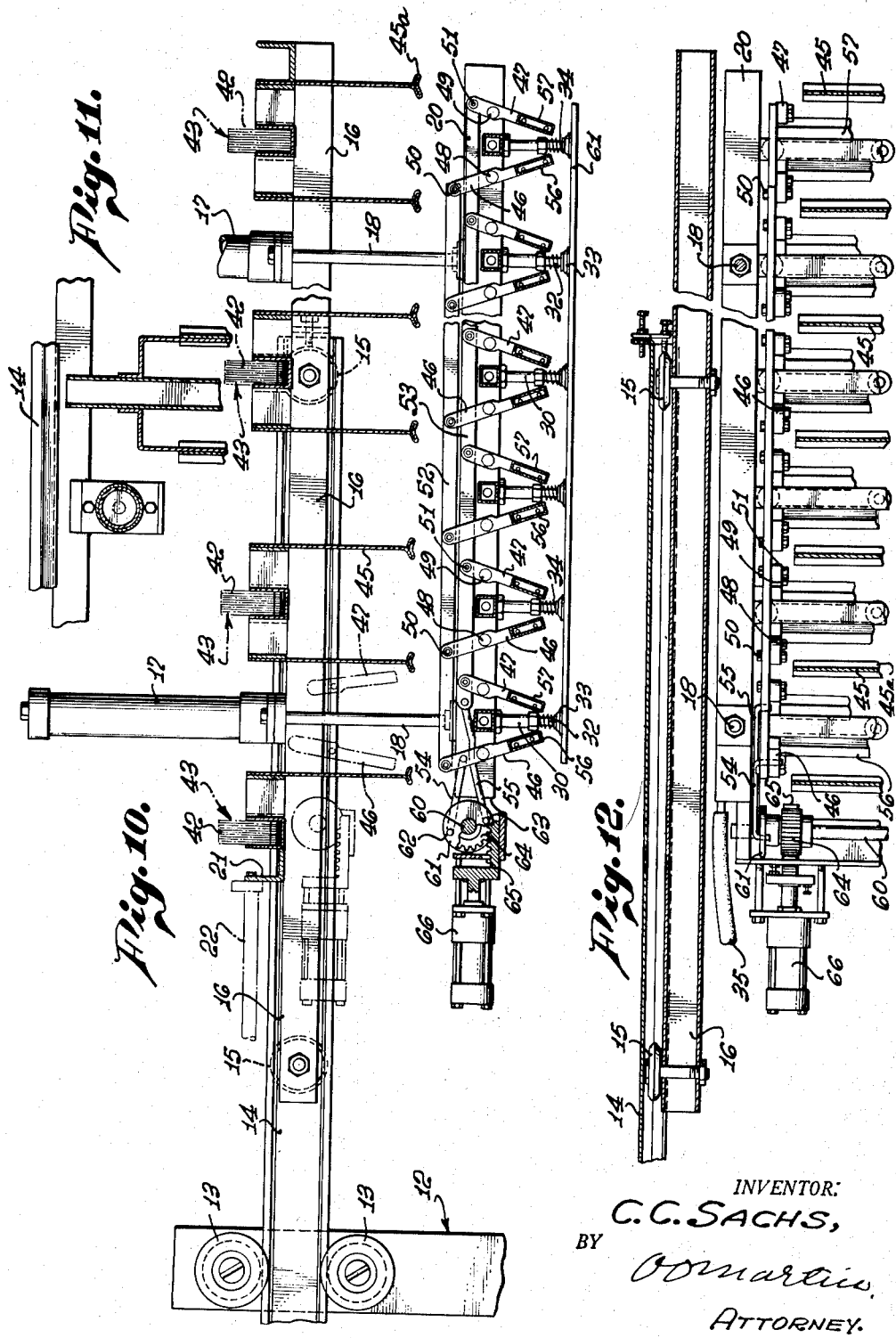

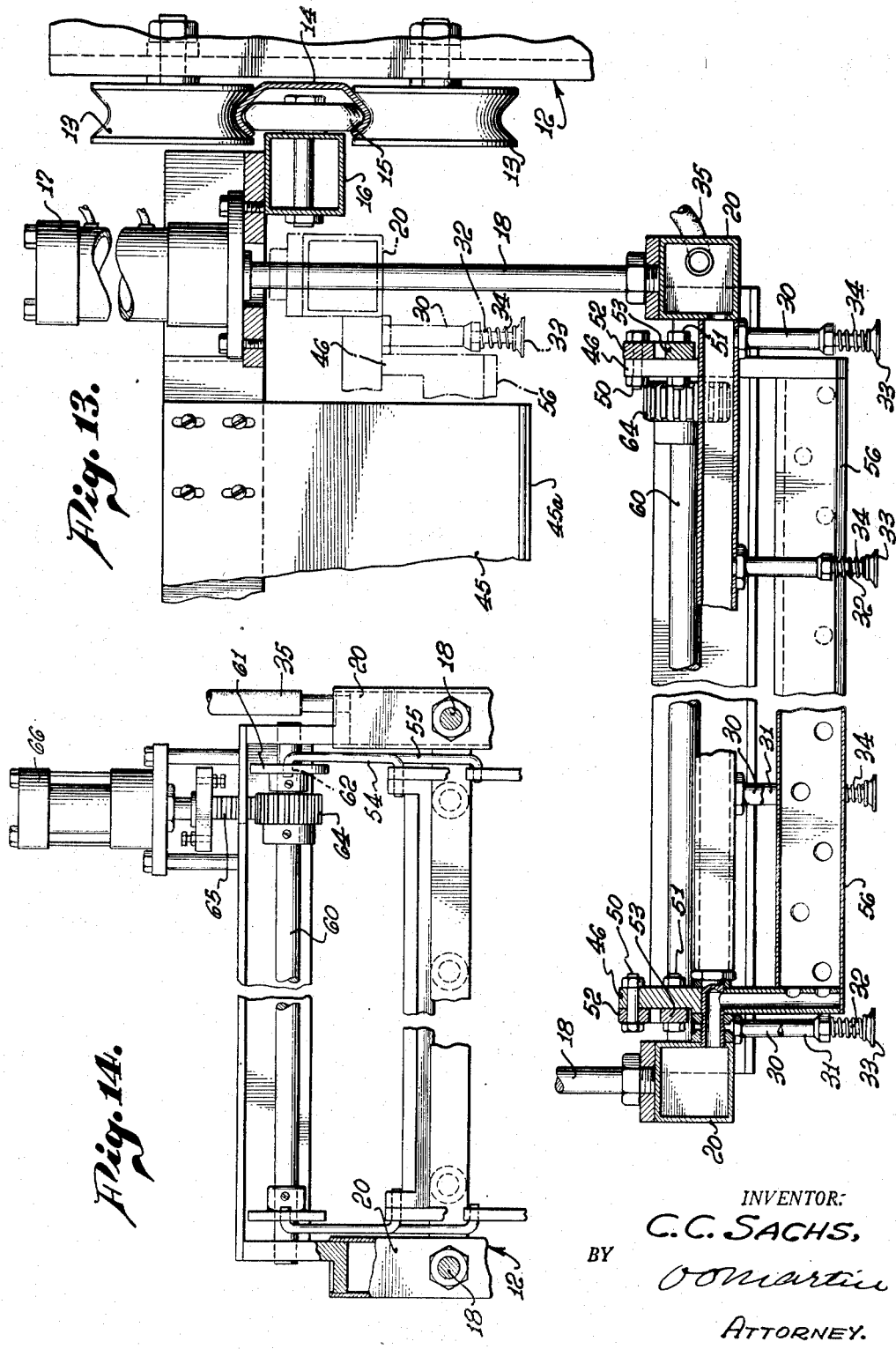

Oct. 21, 1952 — C. C. SACHS — 2,614,949
STRUCTURAL PANEL FORMING MACHINE
Filed Sept. 13, 1949 — 6 Sheets-Sheet 6

INVENTOR:
C. C. SACHS,
BY O. O. Martin
ATTORNEY.

Patented Oct. 21, 1952

2,614,949

UNITED STATES PATENT OFFICE 2,614,949

STRUCTURAL PANEL FORMING MACHINE

Carrol C. Sachs, Sunland, Calif., assignor to Alexander H. Kerr & Co., Inc., Los Angeles, Calif.

Application September 13, 1949, Serial No. 115,400

18 Claims. (Cl. 154—1.6)

The present invention relates to means for integrally forming structural, load bearing panels from prefabricated sheets of material capable of polymerization when subjected to heat, while under pressure.

In Patent No. 2,523,525, issued September 26, 1950, I have shown and described a machine in which a web of suitable fibrous material, saturated with resinous substance in plastic form and capable of polymerization under the influence of heat, is fed on to a platen from a reservoir. An assembly of mandrels is deposited on this web, whereupon a second web of the same material is deposited from the reservoir between and over these mandrels entirely to cover the exposed surfaces thereof. A second assembly of mandrels, shaped to occupy the spaces between the web-covered mandrels, are then deposited therein, whereupon a third web of the same material is similarly spread over the top surface of the web covered mandrel assemblies. Finally, a platen is lowered into position thereon to apply pressure thereto. The lower platen, the mandrels and the upper plates are then heated to the proper temperature for the required period of time to polymerize the three webs into a homogeneous integral unit. When the mandrels subsequently are withdrawn, it is found that the panel is completely integrated and ready for use.

While the panel in this manner formed is in every way perfect and ideal for building construction where a light, load supporting structure is required which is not affected by atmospheric conditions, I have found it a rather complicated matter to carry the fibrous material saturated with a resinous substance back and forth through the machine. It has also been found somewhat difficult to deposit webs of uniform thickness and consistency below, between and over the mandrel assemblies as the latter are placed in position thereon. It has in addition been found difficult to maintain the fibrous material sufficiently plastic to achieve uniform distribution of the material for all three webs. This difficulty arises because the styrene material, available at that time for use in connection with my earlier invention, was subject to rapid setting at ordinary room temperature and, once set, was difficult to dispense in the form of a web. Moreover, I found that such resinous composition tended to soften the styrene bond with the fibrous material such as a glass fiber.

It has, however, lately been found possible to produce a resinous composition which can be prefabricated into sheets of the required consistency for storage and which will still be polymerizable under proper conditions so as to be adapted for production of a load bearing panel with which this invention is concerned.

In view of the foregoing, it is the general object of the present invention to provide convenient and efficient devices for selectively picking up, transporting and positioning prefabricated sheets of polymerizable resinous material of correctly predetermined shapes and sizes on a machine of the type described in my said patent.

Mechanism in accordance with the invention by means of which the various steps necessary to produce the panel of the present invention is hereinafter described in detail and reference is invited to the accompanying drawings in which a preferred form of the invention is illustrated.

In the drawings:

Fig. 1 is a side elevational view of a device embodying the invention;

Fig. 2 shows the left portion of the structure of Fig. 1 with parts thereon in a different position of adjustment;

Figs. 3 and 4 are detail views, on a larger scale, of elements of the device of Fig. 1;

Fig. 5 is an end view of the device showing its relation to portions of the device of said patent;

Fig. 6 is a fragmentary view, on a larger scale, of a portion of Fig. 1;

Fig. 7 is a plan view of the lower portion of the device of Fig. 1;

Figs. 8 and 9 show, on a larger scale, various positions taken by elements of Fig. 1;

Figs. 10 and 11 are fragmentary views, on a larger scale, showing parts of Fig. 1 in different positions of adjustment;

Fig. 12 is a substantially corresponding plan view of one side of the combinations of Fig. 10;

Fig. 13 is a fragmentary end view, on a larger scale, of a portion of Fig. 5;

Fig. 14 is a fragmentary plan view of the lower portion of Fig. 13;

Figure 15:
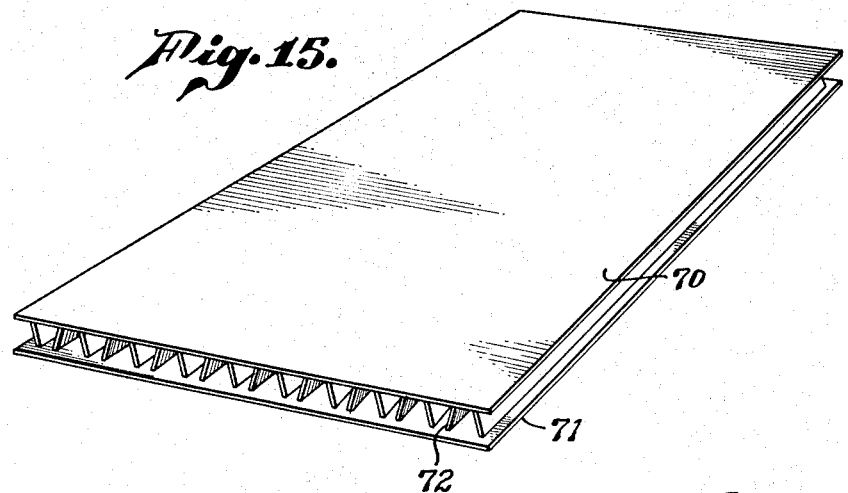
Figure 16:
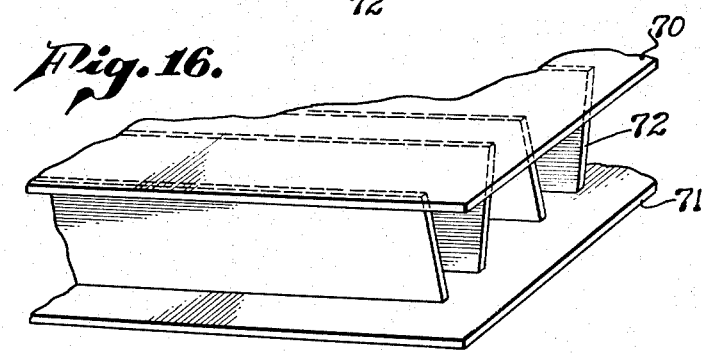

Fig. 15 if an isometric perspective end view of the finished panel;

Fig. 16 is a substantially corresponding side view thereof; and

Figure 17:
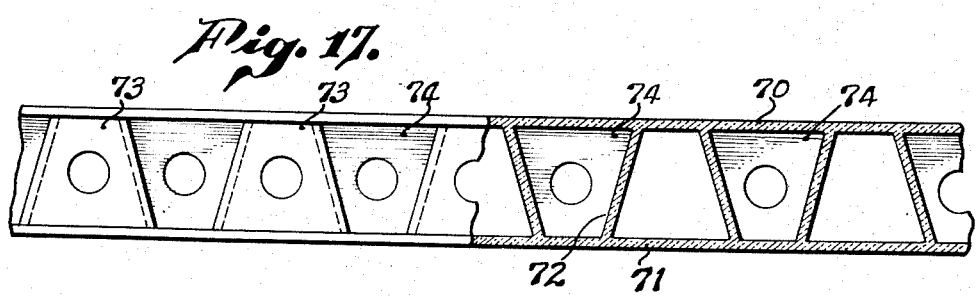

Fig. 17 illustrates a modified form of panel.

As illustrated in Fig. 1, the device of the invention is applied to and used in connection with a hydraulic press including a bed 1 and a ram 2. The latter is mounted for vertical sliding movement on guide posts 3 and is, by pistons 4 extending from cylinders 5, see also Fig. 5, hydraulically operated in any suitable, conventional manner as required for the purpose of the present invention.

On the bed 1 is placed a platen 10 and a similar platen 11 is secured to the underside of the ram 2. The construction of these platens may be substantially as described in my said patent. The platens are heated internally with heat elements.

A frame 12 is placed adjacent to one side of the press and this frame is fitted with horizontally alined pairs of rollers 13 which are spaced apart vertically to guide therebetween a pair of rails 14, as best shown in Fig. 13. The rails are channeled to guide therein the rollers 15 of a carriage 16. A series of vertically disposed cylinders 17 are mounted on this carriage and they are fitted with pistons, the rods 18 of which extend downward to support a sub-carriage 20. These cylinders are connected in any conventional manner to a source of hydraulic or pneumatic pressure to elevate the sub-carriage into the position indicated in dotted outline in Fig. 13 and again to lower it into the full line position of the same view for the purposes which will be described hereinafter.

The carriage 16 is fitted with a cross-bar 21, to the center of which the forward end of a piston rod 22 is secured. This rod extends from a cylinder 23, the ends of which are by conduits 24, 25 suitably connected with a source of pressure for advancing the carriage into the position within the press indicated in Figs. 1 and 7, and again to retract the carriage into the position of Fig. 2.

Within the frame 12 is placed a receptacle 28 of a size to receive therein a stack of sheets of panel forming material 29 which, in the manner which will now be described are, by the carriage, one by one transferred to the platen 10 as required in the course of panel material assembling. From the underside of the sub-carriage depend two rows of tubular stems 30, 31, in which tubular pistons 32 are fitted to slide, each piston terminating in a suction cup 33 and springs 34 maintain these cups normally downwardly extended, see Fig. 13. The sub-carriage is, in this view, shown of tubular construction to provide a passage to the suction cups. This passage is, by a flexible conduit 35, connected with a suitable, conventional source of air suction or pressure. But as such devices and the controls therefore are well known in the art and commonly used, it is not thought necessary to burden this description with a recital thereof.

When the carriage and sub-carriage assembly reaches the retracted position of Fig. 2, pressure fluid is admitted to the cylinders 17 to lower the sub-carriage into the receptacle 28 to cause the suction cups to engage the top surface of the uppermost sheet of panel forming material. Thereupon suction is set up within the sub-carriage so that when the latter is elevated, it will carry with it the top sheet of material. The carriage assembly is then advanced into the press and air admitted to the sub-carriage to release the sheet for deposit on the platen 10.

In my said patent is described the manner in which a mandrel assembly is advanced into position above the bottom web on the platen. Such assembly is fragmentarily shown at 40, in Fig. 7, and a portion of a similar mandrel advance mechanism is outlined at 41, in Fig. 5. However, before the mandrel assembly is advanced, as aforesaid, it is required to pick up and to transport the second portion of panel material to the mandrel assembly. This second portion of panel material is not, in this case, delivered in the form of a single sheet, but is composed of a multiplicity of slats 42 which, as indicated at 43 in Fig. 10, may be held stored within pockets at the top of the carriage 16. As best shown in Fig. 6, these slats are of a width to cover the inclined surfaces of the mandrels 44.

The mechanism by means of which the slats are transferred to the mandrels forms part of the carriage assembly and it is, in Fig. 10 of the drawings, shown to include a series of plates 45 vertically secured to and downwardly projecting from the carriage 16. The bottom edge of each of these plates is folded to form slightly inclined ledges 45a laterally extending therefrom a short distance in both directions. These plates are uniformly and equidistantly spaced between the stems 30 of the sub-carriage 20. Two series of levers 46, 47, are pivotally hung on each of the side members of the sub-carriage, as indicated at 48, 49, and the upper ends of these levers are hung on pivots 50, 51 supported on rods 52, 53. The latter are, by links 54, 55 connected for oscillating movement in opposite directions. On a shaft 60, of the sub-carriage, is fixed a disc 61 having diametrically opposite perforations 62, 63, therethrough of a size to receive therein the bent outer ends of the links. A pinion 64 is secured to the side of this disc and it is in permanent mesh with a rack 65, forming part of the piston disposed in an air cylinder 66, by means of which rotating movement is imparted to the pinion sufficient to oscillate the two sets of levers from the position of Fig. 8 to that of Fig. 9 and again to return them to their initial positions.

The slats 42 are, while the levers remain in the position of Fig. 8, manually pushed into the spaces between the levers and the plates 45, in which position they are supported on the ledges 45a. The lower ends of the levers on each side of the sub-carriage are interconnected by means of hollow, rectangular bars 56, 57 which, in any suitable manner (not shown), are connected with the air suction and pressure devices to draw the slats tightly against the flat sides of the bars and to maintain the slats in this position while the carriage assembly is now advanced into the press to deposit the sheet of panel forming material on the platen, as above described. When fully advanced, the levers are swung into the position of Fig. 9 and the sub-carriage is again lowered to seat the slats against the sides of the mandrels, as best shown in Fig. 6, whereupon the airflow within the bars 56, 57 is reversed to release the slats therefrom.

The sub-carriage is again elevated and the carriage assembly returned to the position of Fig. 2 for the purpose of picking up another sheet 29 from the receptable 28 and to deposit it on top of the second mandrel assembly 68 which, in the meanwhile, has been advanced into the spaces between the slats seated against the sides of the mandrels 44 of the first named mandrel assembly in the manner described in said copending application. The carriage assembly is then returned to the position of Fig. 2.

The ram of the press is now lowered to apply a predetermined amount of pressure against the material surrounding the mandrels and heat is applied to the latter and to the platens in the manner described in my said patent for a definite period of time. It then merely remains to retract the mandrels and to elevate the ram, whereupon the finished panel is removed and the carriage assembly loaded to commence a new panel forming operation. It is one great advantage of this panel that the homogeneous outer facing member, and the inclined spacers therebetween all are of uniform thickness and consistency throughout and that for this reason the panel possesses the greatest carrying and shock resisting capacity proportionate to its size. It is now found possible to impregnate the fibrous material of the panel sheets and slats with a resinous substance which permits withdrawal of the mandrels from the panel when partially polymerized and still hot. Such partial curing of the panel may be obtained while the sub-carriage is being reloaded with parts for another panel. When it is considered that no cooling period is required, as in the case referred to, and that for this reason the platens and mandrels may remain heated during successive operations of the machine, it is seen that production of panels according to my invention may be speeded up considerably.

As disclosed in my said patent and as shown in Figs. 15 and 16 of the drawings, the facing members 70, 71 of the finished panel overhang the spacing members 72 along all four edges. These overlapping portions are of great advantage in mounting the panels in position within the structure for which they are designed. In addition, it is possible to place trapezoidally-shaped plates 73, 74 into the spaces at the ends of the mandrels thereby covering alternate openings at opposite ends of the panel (Fig. 17). This operation may be performed by means of suitable fluid controlled mechanism but it is, in order not unduly to complicate the drawings, for the purpose of the present invention considered manually performed before or at the time the mandrel assemblies come to a stop in fully advanced position. The plates become polymerized with the slats and the upper and lower sheets to form part of the finished panel, substantially as indicated in Fig. 17 of the drawings. The purpose of embodying these end plates is not only materially to strengthen the ends of the panels but also to form plugs which, coming to rest against the stud or other structural element to which the panel is to be secured, aid in correctly aligning the edge of the panel therewith.

As an example of the manner in which the sheets and slats are prefabricated for storage in partly cured condition, a solution composed of the following ingredients is provided: 82.9 lbs. of either a paste type, styrene-polyester copolymer, or an allyl ester resin, is heated in a suitable vessel to approximately 70 deg. C. While maintaining the resin at this temperature, there is incorporated the following materials:

(a) 6.2 lbs. of resin shrinkage-reducing material, such as brucite marble (ground 300 mesh fine).

(b) 4.2 lbs. of a pigment, such as titanium dioxide, previously dispersed in an equal weight of a polymerizable vehicle, e. g. a styrene monomer.

(c) 0.4 lb. of a suitable accelerating agent, such as benzoyl peroxide, dissolved in 2.1 lbs. of a polymerizable vehicle, such as a styrene monomer.

The above materials are then well mixed together to form the resinous composition of the sheets and slats, whereupon this plastic composition is impregnated into a suitable fibrous mat, such as fiber glass, in the proportion of 60 parts, by weight, to 40 parts, by weight, of the fibrous mat. The combined material is thereupon subjected to heat at a temperature of about 70 deg. C. to effect the initial polymerization of the panel material.

After the material has been assembled within the press, heat at the rate of from 120 to 150 deg. C. is applied to complete the polymerization of the assembled panel.

I claim:

1. In a panel forming and heat curing machine, a press, two mandrel assemblies movable into and out of said press, means for supporting a stack of sheets of panel forming material, pneumatic means for picking up one of the sheets from said supporting means and depositing it in the press, means for moving one of said assemblies onto the sheet material in the press, a mechanism for placing slats against the sides of the mandrels in the press, means for placing the second assembly of mandrels into the spaces between the slats resting against the sides of the mandrels in the press, means for transferring a second sheet from said supporting means to a position on top of the mandrel assemblies, and means for heating the press and said mandrel assemblies so as to form the sheets and slats into an integral homogeneous panel.

2. In a panel forming and heat curing machine, a press, two mandrel assemblies movable into and out of said press, storage means for supporting a stack of sheets of panel forming material, means for moving one of the sheets from said supporting means into the press, means for moving one of said assemblies onto the sheet of material in the press, a carriage movable into and out of the press, means for supporting slats on said carriage, a mechanism for moving said slats from said carriage against the sides of the mandrels in the press, said mechanism being positioned to coact with said slat supporting means at selected times, means for placing the second assembly of mandrels into the spaces between the slats resting against the sides of the mandrels in the press, means for transferring a second sheet from the stack of sheets to a position on top of the second mandrel assembly, and means for applying pressure and heat to the press and said mandrel assemblies so as to form the sheets and slats into an integral homogeneous panel.

3. In a panel forming and heat curing machine, a press, two mandrel assemblies movable into and out of said press, means for supporting a stack of sheets of panel forming material, a carriage, means for moving said carriage into and out of the press, pneumatic means on the carriage for picking up a sheet from said supporting means and depositing the sheet in the press, means for moving one of said mandrel assemblies into position on top of the sheet in the press, a mechanism on the carriage for placing slats against the sides of the mandrels in the press, means for transferring the second mandrel assembly to the spaces between the slats in the press, and means for applying pressure and heat to the press and said mandrel assemblies so as to form the sheets and slats into an integral homogeneous panel.

4. A device for mounting and assembling prefabricated sheets and slats of panel material in a machine, said device comprising, a carriage movable into and out of the machine, a sub-carriage suspended from and vertically movable relative to said carriage storage means for supporting a stack of sheets of material, pneumatic means on the sub-carriage for picking up and transferring sheets from the stack to the machine, supports for slats of material on the carriage, and mechanism on the sub-carriage for transferring said slats from the support to the machine, said mechanism being positioned to coact with said slat supporting means at selected times.

5. A device for mounting and assembling prefabricated sheets and slats of panel material in a machine, said device comprising, a carriage movable into and out of the machine, a sub-carriage suspended from and vertically movable relative to said carriage, storage means for supporting a stack of sheets of material, pneumatic means on the sub-carriage for picking up and transferring sheets from said supporting means to the machine, supports for slats of material on the carriage, levers pivotally hung on the sub-carriage adapted to receive the slats from said support, and means for moving said levers on their pivots to deposit the slats in the machine, said levers being positioned to coact with said slat supports at selected times.

6. A device for mounting and assembling prefabricated sheets and slats of panel material in a machine, said device comprising, a carriage movable into and out of the machine, a sub-carriage suspended from and vertically movable relative to said carriage, storage means for supporting a stack of sheets of material, pneumatic means on the sub-carriage for picking up and transferring sheets from said support means to the machine, supports for slats of material on the carriage, levers pivotally hung on the sub-carriage in position to receive slats from said supports and positioned to coact with said slat supports at selected times, pneumatic means associated with said levers for withdrawing the slats from said slat supports, and means for swinging the levers to move the slats into position for deposit in the machine.

7. A device for mounting and assembling prefabricated sheets and slats of panel material in a machine, said device comprising, a carriage movable into and out of the machine, a sub-carriage suspended from and vertically movable relative to said carriage, storage means for supporting a stack of sheets of material, pneumatic means on the sub-carriage for picking up and transferring sheets from the stack to the machine, a series of equidistantly spaced slat supports on the carriage, levers pivotally hung on the sub-carriage intermediate said supports in position to receive the slats from the supports and to coact with said slat supports at selected times to thereby support said slats, mechanism operable to swing the levers on their pivots into position for deposit of the slats in the machine, and pneumatic means for maintaining the slats in position on the levers until ready for depositing.

8. A device for mounting and assembling prefabricated sheets and slats of panel material in a machine, said device comprising, a stationary support frame, a carriage on said frame movable into and out of the machine, a sub-carriage suspended from and vertically movable relative to said carriage, storage means for supporting a stack of sheets of material within the frame, pneumatic means on the sub-carriage for picking up and transferring sheets from the stack to the machine, supports for slats of material on the carriage, and mechanism on the sub-carriage for transferring said slats from said slat supports to the machine, said mechanism being positioned to coact with said slat supports to thereby support said slats.

9. A device for mounting and assembling prefabricated sheets and slats of panel material in a machine, said device comprising, a stationary support frame, a carriage movable into and out of the machine, a sub-carriage suspended from and vertically movable relative to said carriage, storage means for supporting a stack of sheets of material held within the frame, pneumatic means on the sub-carriage for picking up and transferring sheets from the stack to the machine, supports for slats of material on the carriage, levers pivotally hung on the sub-carriage adapted to receive the slats from said slat supports and positioned to coact with said slat supports at selected times to thereby support said slats, and means for moving said levers on their pivots to deposit the slats in the machine.

10. A device for mounting and assembling prefabricated sheets and slats of panel material in a machine, said device comprising, a stationary frame, a track on said frame, a carriage mounted on said track for movement into and out of the machine, a sub-carriage suspended from and vertically movable relative to said carriage, storage means for supporting a stack of sheets of material within the frame, pneumatic means on the sub-carriage for picking up and transferring sheets from the stack to the machine, supports for slats of material on the carriage, levers pivotally hung on the sub-carriage in position to receive slats from said slat supports and positioned to coact with said slat supports at selected times, pneumatic means associated with said levers for withdrawing the slats from their supports, and means for swinging the levers to move the slats into position for deposit in the machine.

11. A device for mounting and assembling prefabricated sheets and slats of panel material in a machine, said device comprising, a stationary frame, a track on said frame, a receptacle within the frame, a carriage on said track, means for moving the carriage on the track into and out of the machine, a sub-carriage suspended from and vertically movable relative to said carriage, pneumatic means on the sub-carriage for picking up and transferring sheets from said receptacle to the machine, a series of equidistantly spaced slat supports on the carriage, levers pivotally hung on the sub-carriage intermediate said supports in position to receive the slats from the supports and positioned to coact with said slat supports at selected times, mechanism operable to swing the levers on their pivots into position for deposit of the slats in the machine, and pneumatic means for maintaining the slats in position on the levers until ready for depositing.

12. A device for mounting and assembling prefabricated sheets and slats of panel material in a machine, said device comprising, a carriage movable into and out of the machine, a sub-carriage suspended from and vertically movable relative to said carriage, storage means for supporting a stack of sheets of material, pneumatic means on the sub-carriage for picking up and transferring sheets from the stack to the machine, a series of equidistantly spaced slat supports on the carriage, levers pivotally hung on the sub-carriage intermediate said supports in position to receive the slats from the supports and positioned to coact with said slat supports at selected times, mechanism operable to swing the levers on their pivots into position for deposit of the slats in the machine, and pneumatic means maintaining the slats in position on the levers, said last mentioned means being adapted to expel the slats from the levers at selected times.

13. In a panel forming machine, a carriage adapted to carry panel elements including spaced facing members and slats, a slat supporting member on said carriage, a vertically movable assembly carried on said carriage, said assembly including facing member carrying means adapted to carry a facing member in a substantially horizontal position, and slat carrying means for carrying slats in a generally vertical position, said slat carrying means being positioned on said assembly to coact with said slat supporting member when said assembly is in a raised position.

14. In a panel forming machine, a carriage adapted to carry panel elements including facing members and slats, a slat supporting member on said carriage, a vertically movable assembly carried on said carriage, said assembly including suction means positioned to carry a facing member in a substantially horizontal position, and slat carrying means for carrying slats in a generally vertical position, said slat carrying means being positioned on said assembly to coact with said slat supporting member when said assembly is in a raised position.

15. In a panel forming machine, a carriage adapted to carry panel elements including facing members and slats, a slat supporting member which depends from said carriage, a vertically movable assembly carried on said carriage, said assembly including suction means positioned to carry a facing member in a substantially horizontal position, and slat carrying means for carrying slats in a generally vertical position, said slat carrying means including a lever which is pivotally supported upon said assembly, said lever being positioned on said assembly to coact with said slat supporting member when said assembly is in a raised position, vacuum means associated with said lever for securing a slat to said lever, and means for actuating said lever whereby a slat may be removed from said slat supporting member.

16. In a panel forming machine, a carriage adapted to carry panel elements including facing members and slats, a pair of downwardly extending slat supporting members each having a lip formed along the lower edge thereof for supporting the slats, said members depending from said carriage, a vertically movable assembly carried on said carriage, said assembly including mechanism for carrying the facing members in a substantially horizontal position, said mechanism including suction means for picking up and supporting the facing members on said assembly, and slat carrying means for carrying slats in a generally vertical position and depositing the slats on a facing member in vertically extending position, said slat carrying means comprising a pair of hollow levers which are pivotally mounted on said assembly, each lever being positioned to coact with a slat supporting member when said assembly is in a raised position so as to hold a slat on said lip of said supporting member, vacuum means associated with said levers for holding said slats against said levers, and means for pivoting said levers whereby the slats may be moved from said lips on said supporting members and lowered to a facing member.

17. In a panel forming machine of the class described, a carriage adapted to carry panel elements including facing members and slats, a pair of downwardly extending slat supporting members each having a lip formed along the lower edge thereof for support of the slats, said members depended from said carriage, a second carriage having mandrels supported thereon and adapted to move transversely of the movement of said first carriage, said mandrels having oppositely tapering sides, a vertically movable assembly carried on said first carriage, said assembly including mechanism for carrying the facing members in a substantially horizontal position, said mechanism including suction means for picking up and holding the facing member on said assembly, slat carrying means for carrying slats in a generally vertical position and disposing slats on a facing member in a vertically extended position, said slat carrying means comprising a pair of hollow levers pivotally mounted on said assembly, each lever being positioned to coact with a slat supporting member when said assembly is in a raised position so as to hold a slat on said lip of said supporting member, vacuum means associated with said levers for holding said slats against said levers, and means for pivoting said levers whereby the slats may be removed from said lips on said supporting members, lowered to a facing member, and laid against the tapering sides of said mandrels.

18. In a panel forming machine, a press, two mandrel assemblies movable into and out of said press, means for supporting a stack of sheets of panel forming material, means for moving one of the sheets from said supporting means into the press, means for moving one of said mandrel assemblies onto the sheet of material in the press, a mechanism for placing slats against the sides of the mandrels in the press, and means for placing the second assembly of mandrels into the spaces between the slats resting against the sides of the mandrels.

CARROL C. SACHS.

REFERENCES CITED

The following references are of record in the file of this patent:

UNITED STATES PATENTS

| Number | Name | Date |
|---|---|---|
| 1,089,274 | Von Sazenhofen | Mar. 3, 1914 |
| 1,406,160 | Klug | Feb. 7, 1922 |
| 1,855,161 | Wyman | Apr. 19, 1932 |
| 1,972,592 | Jacobson | Sept. 4, 1934 |
| 2,021,183 | Heichert | Nov. 19, 1935 |
| 2,049,850 | Lytle et al. | Aug. 4, 1936 |
| 2,364,616 | Boeddinghaus | Dec. 12, 1944 |
| 2,371,847 | Saunders | Mar. 20, 1945 |
| 2,445,290 | Gonda | July 13, 1948 |